United States Patent [19]

Smith

[11] 4,437,608
[45] Mar. 20, 1984

[54] VARIABLE AIR VOLUME BUILDING VENTILATION SYSTEM

[76] Inventor: Robert B. Smith, 4915 Monona Dr., P.O. Box 6141, Madison, Wis. 53716

[21] Appl. No.: 379,111

[22] Filed: May 17, 1982

[51] Int. Cl.$^3$ .............................................. F24F 13/04
[52] U.S. Cl. ....................................... 236/13; 165/16; 236/49
[58] Field of Search ...................... 165/16; 236/13, 49; 98/33 R, 33 A

[56] References Cited

U.S. PATENT DOCUMENTS

| | | |
|---|---|---|
| 3,611,906 | 10/1971 | Lorenz . |
| 3,887,127 | 6/1975 | Jauss .................. 165/16 X |
| 4,073,433 | 2/1978 | Modes .................... 236/49 |
| 4,145,161 | 3/1979 | Skinner . |
| 4,174,065 | 11/1979 | Knauth . |
| 4,189,094 | 2/1980 | Robinson . |
| 4,191,511 | 3/1980 | Stewart et al. . |
| 4,251,027 | 2/1981 | DeHart et al. .......... 236/49 |
| 4,284,943 | 8/1981 | Rowe . |
| 4,407,185 | 10/1983 | Haines et al. ....... 236/49 X |

OTHER PUBLICATIONS

Acme Engineering Prod., Inc., Technical Bulletin, C02 Series Controllers, Dec. 1980.
Acme Engineering Prod., Inc., Technical Bulletin Series, Carbon Monoxide Detection and Control Units, Sep., 1979.
Air Monitor Corporation Brochure Entitled "VARI--Master."
Air Monitor Corporation Brochure Entitled "VOLU--Matic."
Air Monitor Corporation Brochure Entitled "ELECTRONIC Airflow Control Centers".
Air Monitor Corporation Brochure Entitled "The ASS'T. with the BOSS".
Parametrics Brochure Entitled "AC Motor Speed Control."

Primary Examiner—William E. Tapolcai
Attorney, Agent, or Firm—Isaksen, Lathrop, Esch, Hart & Clark

[57] ABSTRACT

A variable air volume ventilation system (10) is disclosed in which the output air flow from a supply fan (13), delivered through a supply duct (11) to various places within a building, is returned by a return duct (15) through a return fan (17) and then through a connecting duct (18) back to the inlet (20) of the supply fan (13). The static pressure in the supply duct (11) is sensed by a static pressure sensor (40), and the output signal indicative of pressure is used by a variable frequency power supply (44) to provide power to drive the fan motors (36, 37) at a frequency inversely proportional to the difference between the sensed static pressure and a desired static pressure, thereby adjusting the flow through the ventilation system to match demand. Outside make-up air is provided through an outside air duct (50) and is fed into the return duct (15) at a position (52) near the inlet (16) of the return fan (17). The air flow through the outside air duct is controlled to a constant flow rate which matches the expected rate of exhaust air from the building so that the flow of air into and out of the building is balanced despite changes in the rate of flow through the ventilating system in response to demand.

9 Claims, 2 Drawing Figures

VARIABLE AIR VOLUME BUILDING VENTILATION SYSTEM

TECHNICAL FIELD

This invention relates generally to the field of heating, ventilating, and air conditioning systems and particularly to such systems which provide for control of the ventilating air volume in response to system demands.

BACKGROUND ART

Variable air volume systems are commonly installed in new commercial and industrial buildings. A primary reason for the popularity of variable air volume systems is their energy efficiency. However, for a variable volume system to operate at its most efficient level, it is necessary to control the supply fan as a function of the system static pressure, to volumetrically synchronize the supply fan and return fan (if one is used), to control the building pressure, and to control the minimum outside air provided to the building to meet ventilating code requirements.

In modern variable volume systems, the control of the supply fan as a function of system static pressure is typically accomplished by using a static pressure sensor located toward the terminus of the air supply system, usually approximately two-thirds of the distance into the system or at a representative location at which monitoring is preferred. Commercially available static pressure sensors provide an output signal that is then processed into an electronic or pneumatic signal which is proportional to the static pressure sensed. The signal proportional to pressure is then used to control the volume of the supply fan so as to maintain the static system pressure reasonably constant despite changes in system demand.

For systems utilizing a return fan as well as a supply fan, it has been typical to use flow sensors on the output of the supply fan and on the input or output of the return fan, allowing the flow rates of the two fans to be compared, and using the comparison signal to control the return fan volume. For example, the volumetric output of the supply and return fans may be controlled by utilizing motorized inlet dampers on the two fans. The supply and return fans are controlled so that a pre-selected flow rate differential between the two fans is maintained, with the return fan having a lower flow rate than the supply fan. The flow differential between the two fans corresponds to the flow of air exhausted from the building to satisfy code requirements. The output of the return fan is directed back to the input of the supply fans, and the difference in flow rate between the two fans is made up by connecting an outside air duct to the input of the supply fan, thereby allowing outside air to flow into the supply fan at a rate equal to the differential between the flows through the supply fan and return fan. The mixture of recirculated and outside air provided to the supply fan may be tempered—heated or cooled—at the input or the output of the supply fan.

Variable air volume systems utilizing a return fan as well as a supply fan provide reasonably good control of the ventilation requirements and pressurization of the building and relative control of the minimum outside air supplied to the building. However, even the best of such systems have certain limitations. Most fundamentally, the minimum outside air supplied to the building may not be precisely controlled because of variations in the flows through the supply and return fans and also because of infiltration of outside air into the building through vents, cracks, etc. In addition, an exhaust opening is typically provided near the outlet of the return fan to allow partial or complete exhaust of the return air from the building under some operating conditions. However, even when the exhaust opening is closed, some air may leak through the damper louver which closes the opening. Since the outside air infiltrating the building is untempered, generally being either too warm or too cool, the introduction of excess outside air results in energy inefficiencies. The infiltrating air drawn into the building is also initially unfiltered.

Where there is a substantial temperature difference between the outside air and the air being recirculated within the ventilation system, the air drawn in at the intake may not mix well with the recirculated tempered air, allowing stratification of hot and cold air within the supply ducts. The stratification of the air may persist even through the supply fan. As a result, moisture condensation may occur in the supply ducts, and the separation of warm and cool air within the ducts may lead to distribution of air at some parts of the system which is too warm while other parts receive air which is too cool. The present supply fan-return fan variable air volume systems also utilize relatively complex and expensive control components, including velocity sensors for both the supply and return fan, a static pressure sensor in the supply duct, motorized inlet dampers for both the supply and return fans, motor starters for both fans, and an air flow instrumentation control center for processing the signals from the velocity sensors and the pressure sensor and providing control signals to the motorized inlet dampers on the supply and return fans. Since the supply and return fans are operated at a constant speed, with the inlet dampers to the two fans being periodically adjusted to control the volume output of each fan, the power consumed by the fans may often be in excess of that necessary to drive the volume of air that the system requires.

DISCLOSURE OF THE INVENTION

In accordance with the present invention, an improved ventilation system is provided in which the flow of outside air into the system is very precisely controlled. Air is introduced at a position just before the return fan and is thoroughly mixed by passage through the return and supply fans so that no stratification of outside air and tempered air takes place within the supply ducts. The volume output of the supply and return fans is controlled in response to static pressure sensed within the system utilizing a minimum of control components. The fan motors are operated by the controls to drive the supply and return fans in a highly energy efficient manner.

The system of the invention is incorporated into a conventional ventilating system which has a supply duct receiving ventilating air from a supply fan, a return duct the air from which is withdrawn by a return fan, and a connecting duct between the outlet of the return fan and the inlet of the supply fan. The connecting duct may also be provided with a dampered, louvered exhaust opening and a dampered, louvered intake opening, both communicating with the outside atmosphere, and both of which are generally closed during the normal operation of the present system. A separate minimum outside air duct extends from communication with the outside atmosphere to connection with the return duct at a position just ahead of the inlet of the return fan. A flow sensor and a motor controlled outside air volume control damper are provided in the minimum outside air duct. The signal proportional to flow velocity within the outside air duct is provided to a constant volume control unit which outputs a signal to the control damper to drive it so as to maintain the air flow within the outside air duct substantially constant. The flow rate which is to be maintained within the outside air duct may be set to substantially match the amount of air which will be normally exhausted from the building by exhaust fans and leakage, such that the flow of air in and out of the building is balanced. By providing the untempered outside air to a position just ahead of the intake of the return fan, the outside air and returning tempered air is thoroughly mixed by passing through the return fan and the connecting duct and thence through the supply fan before reaching the supply duct, thereby assuring that the air within the supply duct is thoroughly mixed and of a uniform temperature. Unwanted outside air, greater than required to meet the minimum ventilation requirements, is avoided because the louvered dampers on the intake and exhaust openings on the connecting duct may be tightly closed since these dampers will not have to be opened during normal operation of the system.

The minimum outside air duct injects a pre-selected volume flow of outside air into the system, matching the flow of air normally exhausted from the building during ventilation. To meet the internal ventilation requirements of the building, which will vary from time to time and place to place within the building, the supply fan and return fan are driven synchronously so that they each displace a synchronized and preferably equal volume flow of air. Preferably, the flow through the supply and return fans is controlled utilizing a static pressure sensor within the supply duct at a position near the terminus of the system. As various of the variable air volume terminal units within the building draw upon the air supply in the supply duct, the pressure monitored by the sensor will change. A decrease in static pressure at the sensor is indicative of an increased demand for flow to various parts of the building, whereas an increase in pressure at the sensor is indicative of a decreased demand. The output signal from the sensor is processed to provide a signal related to pressure received by an electrical power supply unit which provides output power at a frequency which is inversely proportional to the static pressure. The variable frequency power signal is then supplied to the synchronous AC motors which drive the supply fan and the return fan so that the flow through each fan is equal. The amount of outside air injected through the minimum outside air duct will be just sufficient to compensate for the air exhausted from the building so that the flow of air at the inlet of the return fan will be equal to the flow of air exiting from the supply fan. In this manner, the amount of outside air introduced into the building remains constant despite varying ventilation rates as the supply fan and return fan vary in speed. Thus, the system is very precisely controlled so that no more than the necessary minimum amount of outside air is introduced into the system, maximizing energy efficiency and minimizing the electrical power consumed in the supply and return fans, since only the minimum amount of power necessary to drive the required air flow is supplied to the fans.

The air flow through the minimum outside air duct can also be responsive to various conditions within the building to maintain the air quality at pre-selected standards. For example, the concentration of carbon dioxide in the air may be sensed and the flow of minimum outside air increased if the carbon dioxide level is above a pre-determined value. The additional positive pressure introduced under conditions of increased outside air flow would continue only until the carbon dioxide level returned to the desired value; this temporary positive pressure can be eliminated by controlling the building's exhaust fans to increase the exhaust flow or using auxiliary relief dampers to allow exhaust of the additional air.

Further objects, features and advantages will be apparent from the following detailed description taken in conjunction with the accompanying drawings showing a preferred embodiment of a ventilating system incorporating the invention.

BEST MODE FOR CARRYING OUT THE INVENTION

Figure 1:
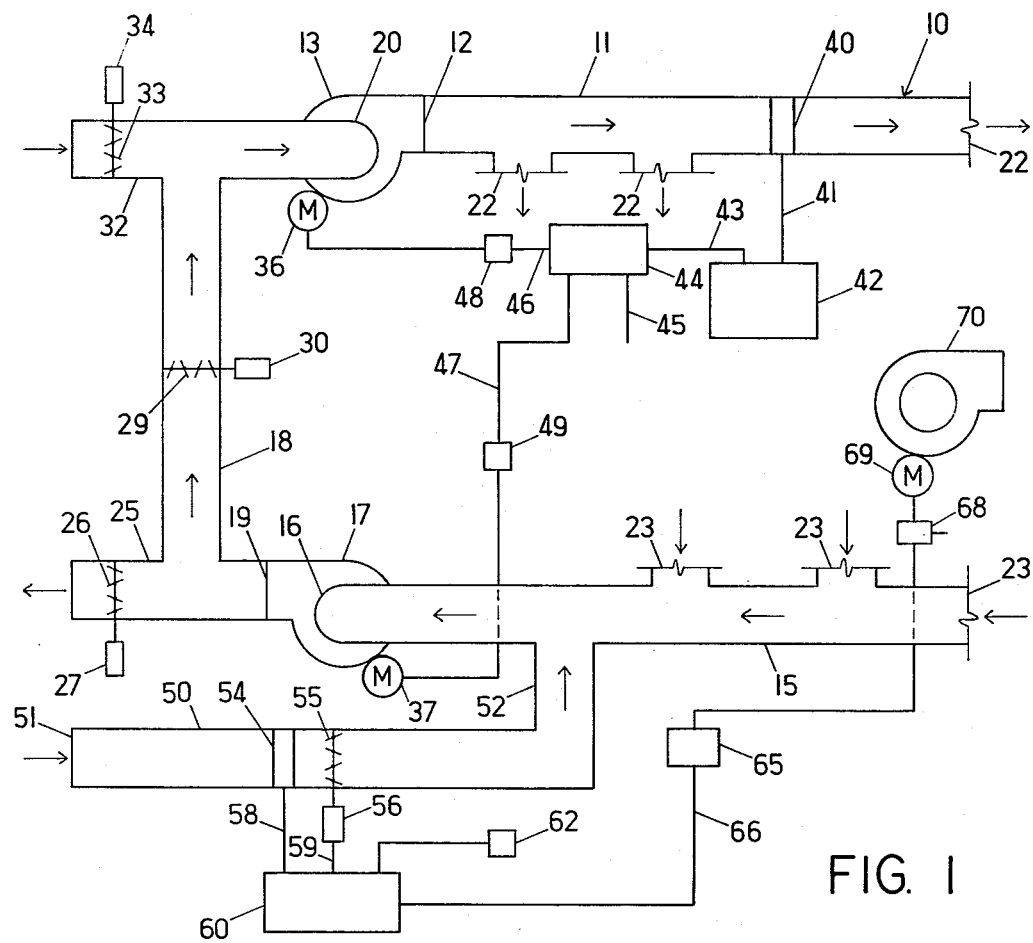
FIG. 1 is a schematic view of a ventilating system for a building which incorporates the present invention.

With reference to the drawings, a building ventilation system controlled in accordance with the invention is shown generally at 10 in schematic form in FIG. 1. The system 10 is particularly adapted for incorporation in larger buildings which have a number of terminal units with a varying demand for ventilation air, either heated or cooled. For example, various areas of the building may be separately controlled by a thermostat and the flow of tempered ventilation air through these areas would be responsive to changes in temperature within the areas. Because of the time varying demand for ventilation air within the building, modern ventilation systems commonly utilize a varying air volume supply for the system to balance the system so that an increased demand by one portion of the system for ventilation air does not decrease the amount of air supplied to another portion of the system.

The system 10 of the invention, as is generally the case for variable air volume systems in general, includes a supply duct 11 receiving air flow from the outlet 12 of a supply fan 13; a return duct 15 delivering air flow to the inlet 16 of a return fan 17; and a connecting duct 18 which delivers air from the outlet 19 of the return fan 17 to the inlet 20 of the supply fan 13. The supply duct 11 generally has at least one and ordinarily several branching ducts 22 which supply air to variable air volume terminal units (not shown), and the air flow passing through these units into various areas of the building is returned back to the return duct 15 by at least one and ordinarily several branch ducts 23. The connecting duct 18 is conventionally has an exhaust stub duct 25, extending from a position near the outlet 19 of the return fan 17, which can exhasut air to the atmosphere. The stub duct 25 is, in the present invention, normally tightly closed by a damper 26 operated by a motor or other actuator 27. Flow through the connecting duct 18 may be controlled by a damper 29 operated by a motor or other actuator 30. Conventionally, an intake stub duct 32 runs into the connecting duct 18 at a position near the inlet 20 of the supply fan 13. The intake duct 32 is normally tightly closed, in the present invention, by a damper 33 operated by an actuator 34. In conventional two-fan variable air volume systems, the damper 26 may be opened to allow a portion of the air from the return fan 17 to flow out into the atmosphere and the dampers 29 and 33 adjusted to a position such that the volume of air flowing through the damper 33 into the supply fan 13 is sufficient to make up the air exhausted from the building through the exhaust fans and through the damper 26. Under some conditions of outside air temperature and return air temperature, a mixture of outside and return air may be closer in temperature to a desired building temperature than the return air by itself. By exhausting some return air through the damper 26 and drawing in a corresponding amount of outside air through the damper 33, the building air temperature may be changed toward the desired temperature without expenditure of additional energy. If the outside air is of good quality (e.g., low humidity, pollution, etc.) and a temperature close to the desired temperature of the building air, the dampers 26 and 33 may be fully opened (a so-called economy or enthalpy cycle) so that all the return air is exhausted and is entirely replaced by outside air. In the system of the present invention, the dampers 26 and 33 will both be tightly closed under normal operating conditions. They may, however, be opened for economy cycle operation, in which case the volume of air exhausted through the damper 26 is equal to the air volume drawn in through the damper 33.

In addition to allowing an economy cycle to be used, as described above, the supply fan - return fan system also has the advantage over a single fan system of providing a better balanced draw of return air from widely spaced areas or different floors of a building.

The supply fan 13 is conventionally driven by an AC induction motor 36, and the return fan 17 is driven by a similar motor 37. In a ventilation system in accordance with the present invention, it is preferred that the operating characteristics of the two fans 13 and 17 and the motors 36 and 37 be selected such that the fans will drive an equivalent flow of air when the motors are provided with electrical power at the same frequency. The speed of the motors, and therefore the flow through the fans, may be changed by changing the frequency of the electric power supplied to the motors. The speed at which the two fans are driven is then varied in response to a condition sensed in the building which is indicative of the ventilation demands of the building. As is conventional, the return fan will generally have a greater displacement and be driven at a lower speed than the supply fan, although the flow through the fans will be the same.

A specific condition responsive control scheme is illustrated in FIG. 1, in which the static pressure within the supply duct 11 at a point near the terminus of the duct is sensed by a static pressure sensor 40. Typically, the pressure sensor 40 will provide a signal on a line 41, which may be a pneumatic pressure signal, which is then processed by a processing unit 42 and converted to a signal on a line 43 (generally an electrical signal), which is proportional to pressure. The signal proportional to pressure on the line 43 is provided to a controlled frequency power supply 44, receiving standard 60 Hz power on a line 45, and delivering variable frequency power on output lines 46 and 47. The power in the lines 46 and 47 is delivered through motor overload protectors 48 and 49 to the motors 36 and 37, respectively. The static pressure sensor 40 and associated processor 42, and the frequency controlled power supply 44, may be chosen from any of the commercially available units that provide the desired functions. Examples of suitable pressure sensors and processors are those produced by Air Monitor Corporation of Santa Rosa, Calif., and an example of a suitable frequency controlled power supply is that produced by Parametrics Division of Zero-Max Industries, Inc. under the name PARAJUST. Because the power supplied on the lines 46 and 47 will have a frequency inversely proportional to the difference between the pressure sensed at the sensor 40 and a desired pressure, an increase in pressure at the sensor will result in a decrease in the speed of the motors and thus the flow through the fans 13 and 17. The decrease in flow through the fans 13 and 17 will thereby reduce the pressure within the supply duct 11, and the pressure at the sensor 40, the reduction in pressure continuing until a pre-selected pressure is reached at the sensor 40, at which time the speed of the motors 36 and 37 is stabilized.

Since the characteristics of the fans 13 and 17 and of the motors 36 and 37 are matched, the flow through the fans will be equal despite variations in flow rate. However, the volume of air flowing into the return duct 15 from the branch ducts 23 will not equal the air flow through the supply fan 13 because the air exhausted from the building through exhaust fans will not flow into the return duct. To make up the air volume that is exhausted from the building, and to allow introduction into the building of the minimum outside air specified by building code requirements, an outside air duct 50 is provided which extends from an intake 51, in communication with the outside atmosphere, to connection to the return duct 15 at an outlet 52 located ahead of the inlet 16 of the return fan 17. The connection 52 between the outside air duct 50 and the return duct 15 is preferably located down-stream of all of the branch return ducts 23. A flow sensor 54 is mounted within the outside air duct 50 to sense the rate of flow (velocity) of the air passing through the duct. An outside air volume control damper 55 is also mounted within the outside air duct 50 and is adjustable by an actuator 56 to control the air flow through the outside air duct. The flow sensor 54 provides an output signal on a line 58, and the actuator 56 receives a control signal on a line 59. The lines 58 and 59 are connected to a constant volume controller 60. The controller 60 processes the signal proportional to air velocity in the duct 50 and provides an output control signal on the line 59 to the actuator 56 to adjust the position of the damper 55 so as to maintain the air velocity within the duct 50 substantially constant. The desired constant velocity of air within the duct 50 may be set by a remote control unit 62 which is set by an operator such that the flow through the duct 50 will be maintained at a flow rate substantially equal to the expected amount of air exhausted from the building. The controller 60, with the flow sensor 54 and damper 55, thus provides a means for maintaining the flow within the outside air duct 50 substantially constant despite changes in the flow through the return fan 17 occurring in response to changes in ventilation requirements in the system which result in variations in fan motor speed.

In addition to providing the minimum outside air requirements of the building, the system 10 shown in FIG. 1 can readily be adapted to allow control of various other ventilation conditions. For example, the level of carbon dioxide within the building can be sensed by a unit 65 which provides a signal on a line 66 to the controller 60. If the level of carbon dioxide sensed by the unit 65 is above a pre-determined maximum, the signal on the line 66 will then cause the controller 60 to open the damper 55 wider, allowing a greater flow of air through the outside air conduit and into the return fan. Since the flow of air exhausted from the building does not commensurately increase, the pressure within the building will increase to accommodate the additional air brought in through the outside air duct 50. This temporary additional pressurization is ordinarily small and not of major significance. However, to allow complete balance of the system, the signal from the unit 65 may also be provided to a controller 68 which controls the power supplied to the motor(s) 69 of one or more of the exhaust fans 70 in the building to cause these fans to exhaust a larger amount of air when a signal on the line 66 is present. Various other arrangements for increasing the exhaust of air from the building may also be utilized, such as, for example, opening up the exhaust damper 26 in response in the signal on the line 66.

The carbon dioxide sensing unit 65, the flow or velocity sensor 54, the controller damper 55, and the controller 60 may be of any of the various types of commercial units which are available to provide the functions specified for these units.

Figure 2:
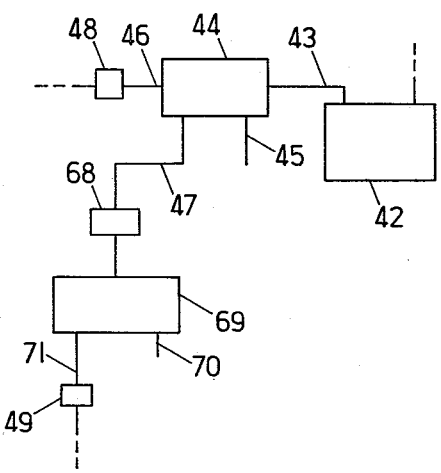
FIG. 2 is a schematic diagram of a modified controller for the fan motors in the ventilating system of FIG. 1.

Under certain circumstances, the frequency controller 44 may not have a sufficient amperage or power output to drive both of the fan motors 36 and 37. Additionally, it is possible to have multiple supply fans and multiple return fans all operating in synchrony. To provide driving of the additional fans, all slaved to the same control signal, a control scheme as illustratively shown in FIG. 2 may be utilized. The output control signal from the power supply 44 on the line 47 is first provided to a signal interface unit 68 which provides signal isolation; the output of the interface unit 68 is then fed into another variable frequency, controlled power supply 69 which is substantially identical to the power supply 44. The supply 69 receives power at 60 Hz on an input line 70 and delivers output power at a variable frequency slaved to the output signal on the line 47 on an output line 71 which then feeds through the overload protector 49 to the return fan motor 37. It is apparent that as many motors as desired can be driven utilizing the foregoing scheme in which two or more of the controlled frequency power supplies, such as the supplies 44 and 69, are used.

It is also noted that the power consumed by the motors 36 and 37 may be minimized by utilizing a power supply scheme in which the voltage provided to these motors is decreased or increased in proportion to the frequency of the supply voltage. In this manner, as the speed of the fans is decreased due to the decreased synchronous speed of the motors, the voltage applied to the motors is also decreased, thereby minimizing the power consumption required to drive a given volume of air through the fans.

The speed of the fans 13 and 17 may also be controlled in response to other conditions sensed in the system, such as the ambient static pressure in a particular room or the air flow at particular locations within the system. Of course, various types of fans could be utilized as the supply and return fans 13 and 17, including vane axial fans as well as the centrifugal fans commonly used. It is noted that vane axial fans are available with adjustable pitch blades, and, as an alternative to the driving of the motors 36 and 37 with variable frequency power, the adjusted vane axial fans could be driven at a variable speed by supplying their drive motors with variable frequency power. A particular advantage of controlling the frequency of power supplied to the fans is that commercial variable frequency motor power supplies commonly provide a start-up power mode for the motors so that separate motor starters are not needed.

In the typical ventilation system, heating or cooling and filtering of the circulating air occurs just before or just after the supply fan 13. Thus, the untempered outside air brought in through the outside air duct 50 will have a long path in which it can mix with the circulating tempered air in the return duct 15, particularly as the air mixture passes through the return fan 17 and the connecting duct 18, so that virtually no stratification of air will exist after the circulating air has passed through the supply fan 13 into the duct 11.

The system may be adjusted for night set back by shutting the outside air damper 55 and lowering speed of the fans so that the air within the building circulates at a lower rate. During morning start-up, the damper 55 would remain closed and the fans 13 and 17 operated at full capacity until the desired operating temperature was reached.

It is understood that the invention is not confined to the particular construction and arrangement of parts herein illustrated and described, but embraces such modified forms thereof as come within the scope of the following claims.

I claim:

1. A ventilation system for a building comprising:
   (a) a supply duct;
   (b) a return duct;
   (c) a supply fan, having an inlet and an outlet connected to the supply duct, which is driven by an AC electric motor;
   (d) a return fan, having an inlet and an outlet connected to the return duct, which is driven by an AC electric motor;
   (e) a connecting duct extending from the outlet of the return fan to the inlet of the supply fan;
   (f) means responsive to a condition indicative of the ventilation demands of the building for providing electrical power to the motors driving the supply and return fans at a frequency varying in response to the condition sensed in the building to change the speed of the fans in a manner which tends to restore the condition to a pre-selected value;
   (g) an outside air duct extending from an intake communicating with the atmosphere outside the building to connection to the return duct at a position ahead of the inlet of the return fan;
   (h) a flow sensor positioned in the outside air duct to sense the air velocity therein and provide an output signal indicative thereof;
   (i) damper means in the outside air duct responsive to a control signal for controlling the resistance to flow therethrough and thereby controlling the velocity of air flow in the outside air duct;
   (j) outside air duct control means, receiving the output signal from the flow sensor and connected to provide a control signal to the damper means, for controlling the damper means in response to the rate of flow in the outside air duct to maintain a substantially constant flow velocity in the duct, whereby the flow rate through the outside air duct may be set to match the expected flow rate of air exhausted from the building being ventilated.

2. The ventilation system of claim 1 wherein the means responsive to a condition in the building includes a static pressure sensor positioned in the supply duct to sense the static pressure therein and supply an output signal indicative thereof, and also includes power supply means responsive to the output signal from the static pressure sensor for providing electrical power to the motors driving the supply and return fans at a frequency varying inversely with the difference between a desired supply duct pressure and the pressure sensed by the static pressure sensor in the supply duct.

3. The ventilation system of claim 1 wherein the outside air duct control means allows adjustment of the selected flow rate through the outside air duct to allow matching of the flow therethrough to the expected flow of exhaust air from the building.

4. The ventilation system of claim 1 including means for sensing the level of carbon dioxide in the building and providing a control output signal indicative of a level of carbon dioxide higher than a preselected level, and wherein the outside air duct control means is responsive to the signal from the means for sensing carbon dioxide to increase the flow through the outside air duct when the carbon dioxide level is above the pre-selected level and to reduce the outside air duct flow to the normal flow rate when the carbon dioxide level is at or below the pre-selected level.

5. In a ventilation system for a building having a supply fan with an inlet and an outlet, a return fan with an inlet and an outlet, a supply duct connected to the outlet of the supply fan, a return duct connected to the inlet of the return fan, and a connecting duct connecting the outlet of the return fan to the inlet of the supply fan, the improvement comprising:
  (a) an outside air duct extending from an outside air intake to connection to the return duct at a position ahead of the inlet of the return fan;
  (b) a flow sensor positioned in the outside air duct to sense the air velocity therein and provide an output signal indicative thereof;
  (c) damper means in the outside air duct responsive to a control signal for controlling the resistance to flow of air therethrough and thereby controlling the velocity of air flow in the outside air duct;
  (d) outside air duct control means, receiving the output signal from the flow sensor and connected to provide a control signal to the damper means, for controlling the damper means in response to the rate of flow in the outside air duct to maintain a substantially constant flow velocity therein, whereby the flow rate through the outside air duct may be set to match the expected flow rate of air exhausted from the building being ventilated.

6. The ventilation system of claim 5 including a static pressure sensor positioned in the supply duct to sense the statis pressure in the duct and provide an output signal indicative thereof; and
  wherein the supply fan and return fan are each driven by an AC electric motor; and further including,
  power supply means responsive to the signal from the static pressure sensor for providing electrical power to the motors driving the supply and return fans at a frequency varying inversely with the difference between a desired supply duct pressure and the pressure sensed by the static pressure sensor.

7. The ventilation system of claim 5 wherein the outside air duct control means allows adjustment of the selected flow rate through the outside air duct to allow matching of the flow therethrough to the expected flow of exhaust air from the building.

8. The ventilation system of claim 5 including means for sensing the level of carbon dioxide in the building and providing a control output signal indicative of a level of carbon dioxide higher than a preselected level, and wherein the outside air duct control means is responsive to the signal from the means for sensing carbon dioxide to increase the flow through the outside air duct when the carbon dioxide level is above the pre-selected level and to reduce the outside air duct flow to the normal flow rate when the carbon dioxide level is at or below the pre-selected level.

9. A method of supplying the outside make-up air needs of a building having a supply fan providing air to a supply duct and a return fan receiving air from a return duct and delivering its output back to the supply fan, comprising:
  (a) controlling the supply and return fans so that the flow through each is substantially equal;
  (b) changing the flow in the supply and return fans in response to a condition sensed in the building being ventilated; and
  (c) supplying outside air to the return duct at the inlet of the return fan at a substantially constant flow rate despite variations in the flow through the supply and return fans as the fans are controlled to respond to changes in the condition sensed in the ventilation system.

* * * * *